UNITED STATES PATENT OFFICE.

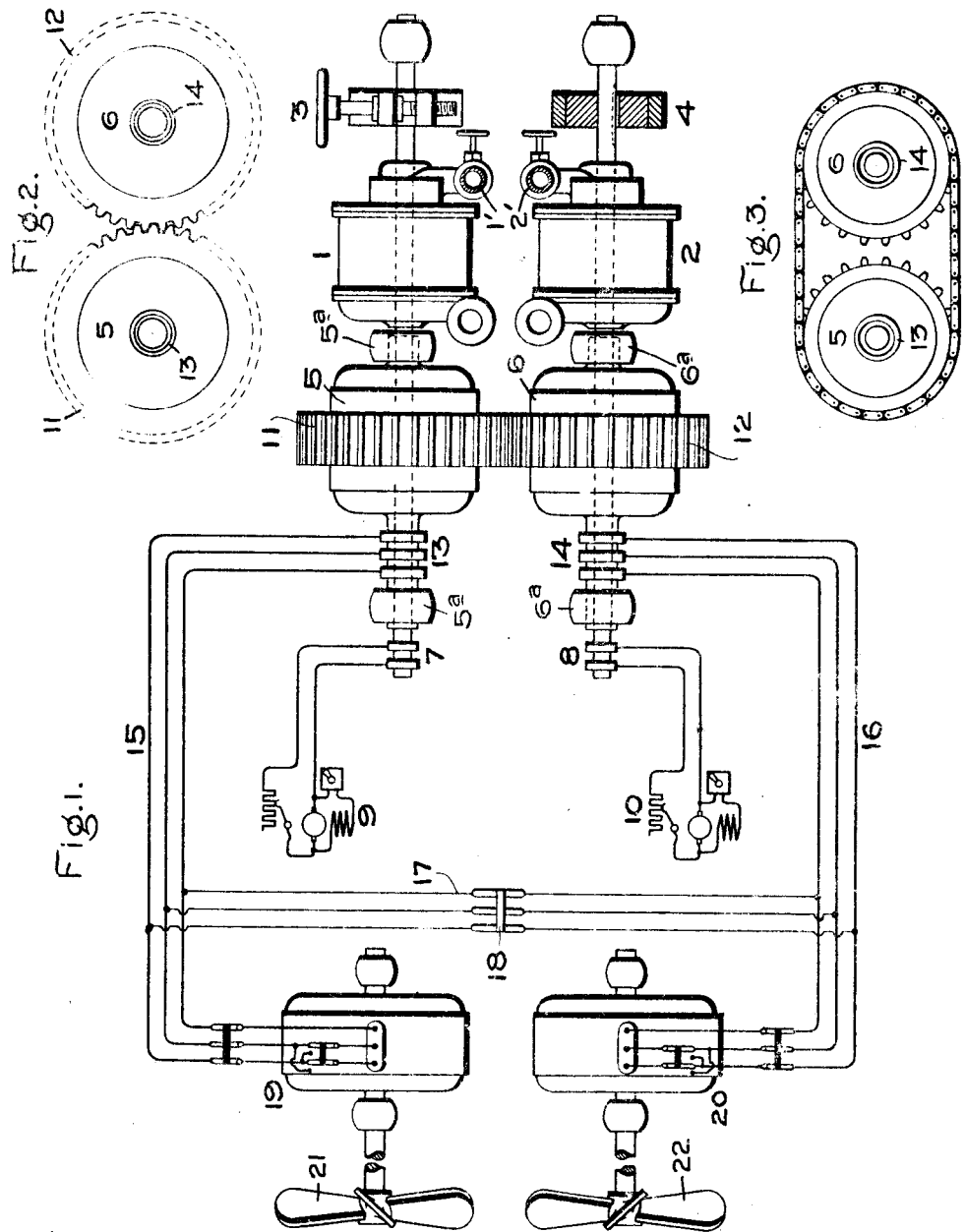

ELIHU THOMSON, OF SWAMPSCOTT, MASSACHUSETTS, ASSIGNOR TO GENERAL ELECTRIC COMPANY, A CORPORATION OF NEW YORK.

TURBO-ELECTRIC SHIP PROPULSION.

1,047,593.  Specification of Letters Patent.  Patented Dec. 17, 1912.

Application filed January 16, 1911. Serial No. 602,924.

*To all whom it may concern:*

Be it known that I, ELIHU THOMSON, a citizen of the United States, residing at Swampscott, county of Essex, State of Massachusetts, have invented certain new and useful Improvements in Turbo-Electric Ship Propulsion, of which the following is a specification.

This invention relates to the propulsion of vessels by means of electric motors supplied with current from turbo-generators.

The main object of the invention is to render applicable to marine propulsion steam turbines of high economy in space, steam and material, and running normally at high speed. Another object is to permit flexibility of control as to speed of propulsion without interfering with the economical high speed of the turbine.

A further object of the invention is to facilitate maneuvering by reversing the direction of rotation of one or both of the propelling screws, where there are two or more, while still maintaining the high speed and economical relations of the prime mover.

These objects are readily accomplished by interposing between the turbine or turbines and the propelling screws electric generators and motors, preferably of the three-phase type.

In the present case the invention is shown as applied to a pair of propelling screws, each driven by an induction motor, in which it is preferable to develop a greater number of poles than there are in the generators supplying the current for said motors, since this secures a proper low speed for the screws, when the generators are running at full speed. Each motor is preferably supplied with current from its own generator, although provision is made for connecting both generators so that each motor may derive current from either or both as may be desired. The generators are of the revolving field type, and have their field magnets mounted on the same shafts as the turbine bucket wheels. They are excited from suitable direct current exciters in the usual way through slip rings on their shafts. That part of the generators in which the current is induced by the revolving field magnet, and which may be called the armature structure, is not stationary, as is so often the case, but is mounted on bearings so as to be capable of revolving concentric to the revolving field magnet. The windings of said armature are connected to slip rings from which the current generated therein may be led off to the motors. The turbines which drive the revolving field magnets are of a high-speed, high-efficiency type, suitably governed to maintain steady speed under variations of load. The shaft of each turbine is provided with a brake or clutch to enable it to be held firmly from revolving when desired, for a purpose hereinafter set forth.

In the accompanying drawing, Figure 1 is a diagram showing one embodiment of my invention; Fig. 2 is an end elevation of the revolving armatures of the generators, shown geared together, and Fig. 3 shows these armatures connected by sprocket wheels and a chain.

The pair of turbines 1 and 2 are suitably supplied with steam through the pipes 1' and 2'. The various controlling and governing appliances are omitted for the sake of clearness. The shafts of these turbines are extended as shown and provided with clutches 3 and 4 by means of which either shaft may be held stationary. One part of each clutch is of course firmly keyed upon the shaft, while the other part which holds it is attached to the framework of the ship or to the frame of the engine. The form of clutch shown is a friction band surrounding a disk on the shaft and adapted to be closed thereon by a screw, but it is to be understood that any suitable clutch may be used.

The generators indicated at 5 and 6 are peculiar in having their armatures capable of revolving concentric with the revolving field magnets which are mounted on the turbine shafts, said armatures being preferably provided with tubular journals which are sleeved upon the main shafts and received in suitable bearings 5ª and 6ª. The main shafts extend beyond said bearings to afford room for the slip rings 7 and 8 by means of which current is taken into the revolving field magnets from the exciters 9 and 10, provided with the usual means for regulating the potential thereof.

The revolving armatures 5 and 6 are suitably connected so as to turn simultaneously. This may be accomplished by means of annular gear wheels 11 and 12 surrounding and secured to said armatures and meshing with each other, as shown in Figs. 1 and 2, Or, if the generators cannot be placed close enough together for this, the armatures may be connected by sprocket wheels and an endless chain (Fig. 3) or by an idler gear wheel, or otherwise. In case the gears mesh together, as shown, the two armatures will revolve in opposite directions, while in the case of belt or similar gearing they will revolve in the same direction.

Sets of slip rings 13 and 14 are provided on the sleeved journals of the armatures, suitably connected to the windings of said armatures, and the brushes on these slip rings feed current to the polyphase lines 15 and 16 which are connected to the stators of the induction motors 19 and 20. The rotors of said motors are mounted on the shafts of the propelling screws 21 and 22. Suitable open-circuiting and phase-interchanging switches are provided for controlling said motors, while the leads 15 and 16 can be connected or disconnected at will by means of the cross conductors 17 and the switch 18.

The operation of the system as thus arranged is as follows:—For full propulsion speed and power, the turbines 1 and 2 work at or not far below maximum load at high efficiency and at high speed, as determined by proper governing, and rotate the revolving field magnets of the generators 5 and 6. In the arrangement shown in Figs. 1 and 2, the turbines rotate in the same direction, and the magnetic drag exerted by the revolving field magnets upon the revoluble armatures will tend to turn the latter also in the same direction as said field magnets. But inasmuch as these armatures are geared together, they cannot turn in the same direction, so that so long as the torque exerted by the two turbines remains equal there will be no movement of the armatures, each opposing the tendency of the other to rotate. If the gearing is of the type indicated in Fig. 3, where both armatures can turn in the same direction, then the turbines must be arranged to run in opposite directions in order to secure immobility of the armatures. The polyphase current generated in these armatures is taken off the slip rings 13 and 14 to the two motors, and with the turbines running at full speed, and the armatures held stationary in the manner set forth, the current will be of the maximum frequency. If the switch 18 is open, then each generator drives its own propelling motor, but if said switch is closed, both generators feed into both motors, operating in parallel.

If, now, it is desired to reduce the speed of the motors and their screws to one half of full speed, one of the turbines is brought to rest by shutting off the steam therefrom, and by setting the clutch so as to hold its shaft from rotation. The field magnets of the two generators remain excited, but one is now stationary and the other is being revolved at full speed by the turbine which is still taking steam. The result is, that the latter begins to carry around with it its revoluble armature, which by reason of the gearing causes the armature of the other generator to begin to revolve also. The speed of these armatures will increase until it equals one half that of the field magnet which is still in motion at which speed the magnetic drag or pull of the latter is balanced by the magnetic retardation exerted by the stationary field magnet. Under these conditions, the frequency of the currents developed in both armatures drops to about one half that of the current generated when both armatures are stationary. This low frequency current delivered to the motors lowers the speed of the screws to about one half full speed, that is, to a speed suitable for cruising and maneuvering.

Some variations of speed may be secured by varying the excitation of the revolving field magnets, whether both are in motion or only one, and also by varying the speed of the driving dynamo in the latter case, by suitably governing the turbine. Furthermore, if both turbines are in action, one may have a different speed from the other, but the gearing between the armatures will equalize the frequencies developed on the two sides, and thus intermediate frequencies between the highest and the lowest may be obtained.

In accordance with the provisions of the patent statutes, I have described the principle of operation of my invention, together with the apparatus which I now consider to represent the best embodiment thereof, but I desire to have it understood that the apparatus shown is only illustrative, and that the invention can be carried out by other means.

What I claim as new and desire to secure by Letters Patent of the United States, is,—

1. In a system of ship propulsion, the combination with a pair of turbines, of polyphase generators having their revolving field magnets on the shafts of said turbines, revoluble armature structures for said generators, gearing connecting said armatures, and propelling motors electrically connected with the windings on said armatures.

2. In a system of ship propulsion, the combination with a pair of turbines, of polyphase generators having their revolving field magnets mounted on the shafts of said turbines, revoluble armature structures for said generators, gearing connecting said armatures, means for holding stationary either one of said turbine shafts, and propelling motors electrically connected with the windings on said armatures.

3. In a system of ship propulsion, the combination with propelling motors of the induction type, of polyphase generators having revoluble armatures, gearing connecting said armatures, revolving field magnets for said generators, steam turbines mounted on the field magnet shafts and arranged to revolve said magnets in such directions as to put opposing magnetic drags on the revoluble armatures, and means for holding either of said field magnets stationary.

4. In a system of ship propulsion, the combination with a plurality of prime movers, propeller shafts, and motors for driving the shafts, of alternating current generators supplying current to the motors, said generators having revoluble field magnets and armature structures, one set of said revoluble generator members being mounted on shafts driven by the prime movers, and means including gearing connecting the members of the other set for varying the frequency of the current supplied to the motors.

In witness whereof, I have hereunto set my hand this twelfth day of January, 1911.

ELIHU THOMSON.

Witnesses:
JOHN A. McMANUS, Jr..
CHARLES A. BARNARD.